Figure 1:
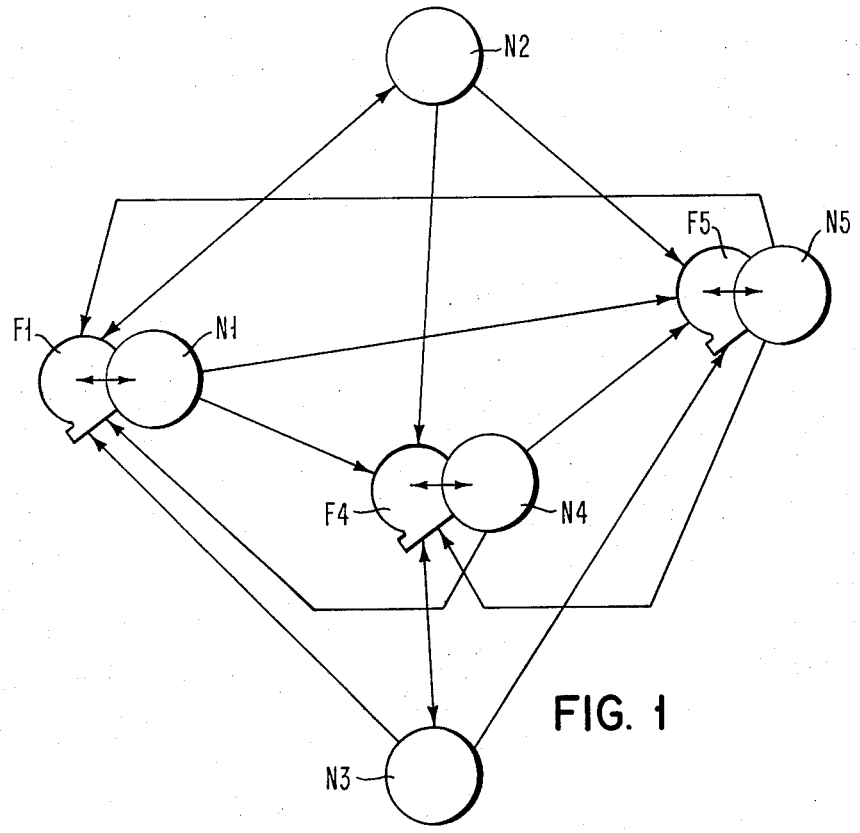
Figure 6A:
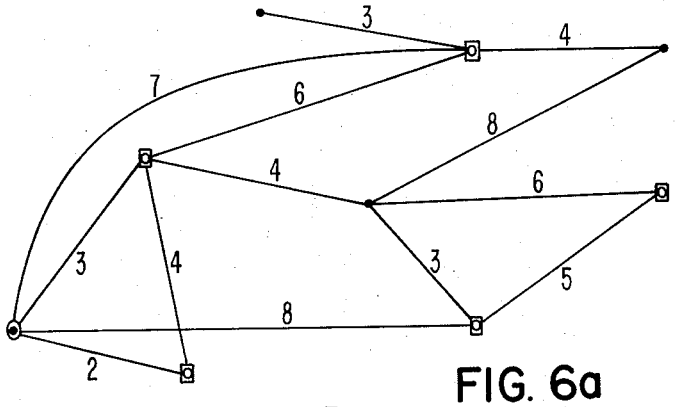
Figure 6B:
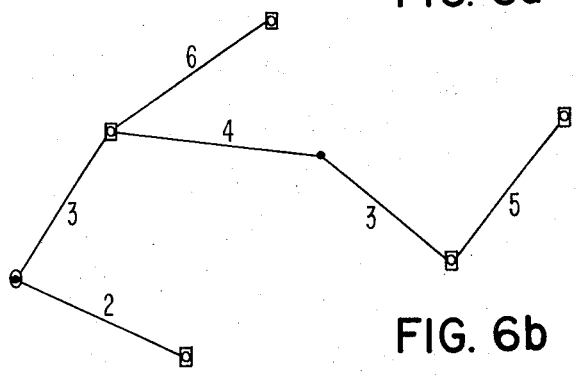
Figure 2A:
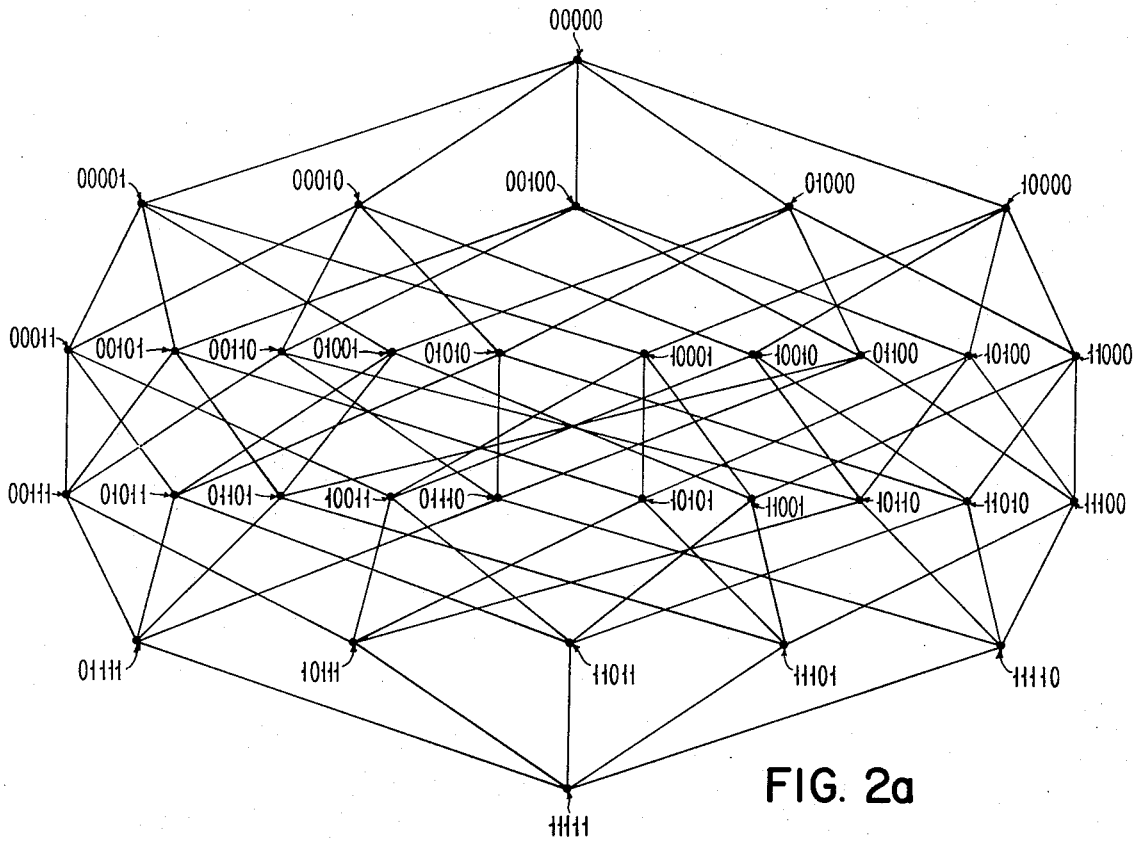
Figure 2B:
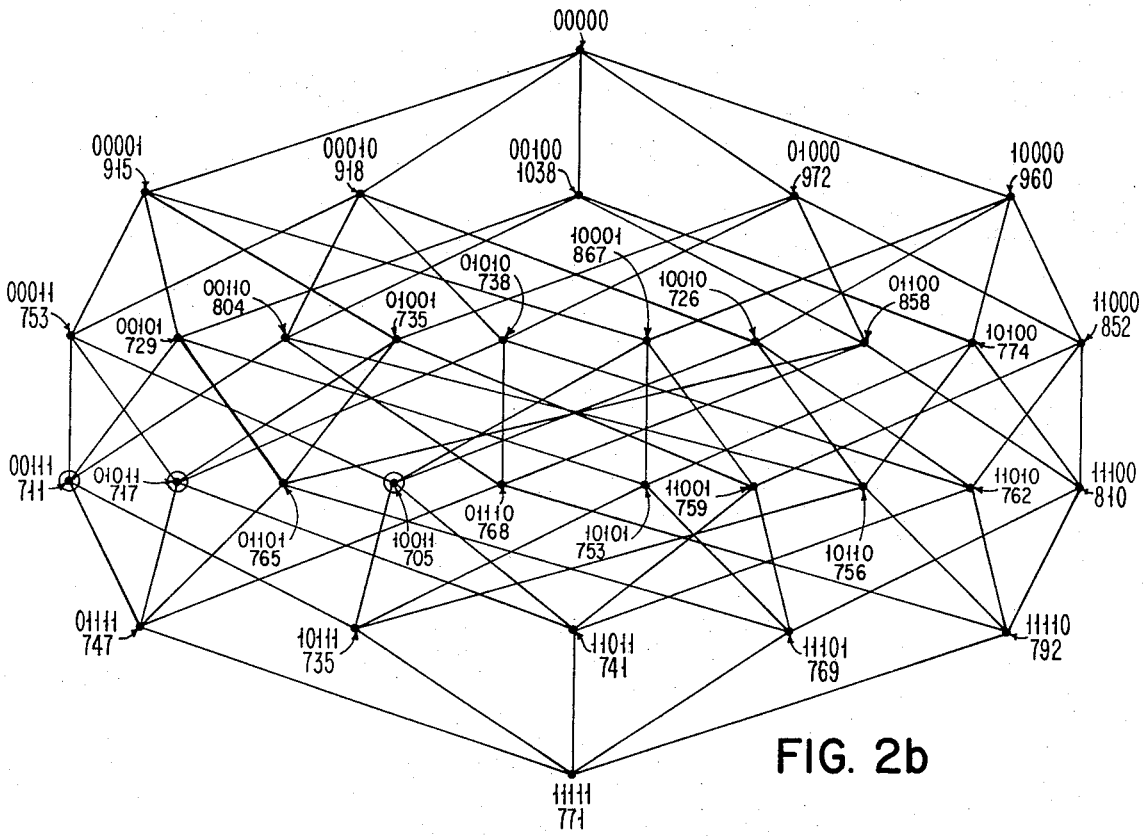
Figure 7:
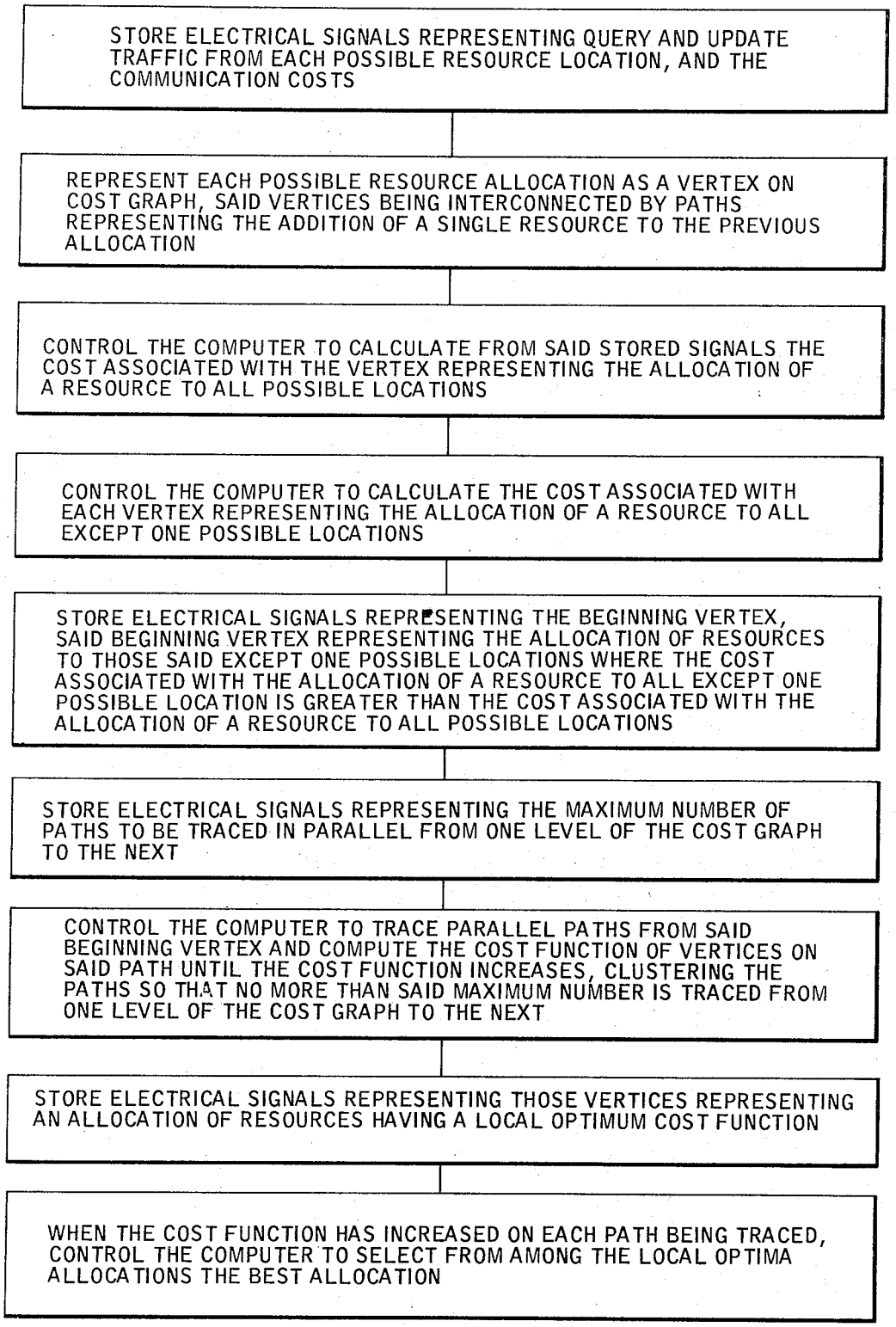

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 869

T921,022

INTEGER PROGRAMMING METHOD FOR GEOGRAPHICALLY DISTRIBUTING IDENTICAL RESOURCES

Richard George Casey, San Jose, Calif., assignor to International Business Machines Corporation, Armonk, N.Y.

Continuation of application Ser. No. 292,007, Sept. 25, 1972. This application Aug. 17, 1973, Ser. No. 389,395

Int. Cl. G06f *9/12*

U.S. Cl. 444—1

4 Sheets Drawing. 33 Pages Specification

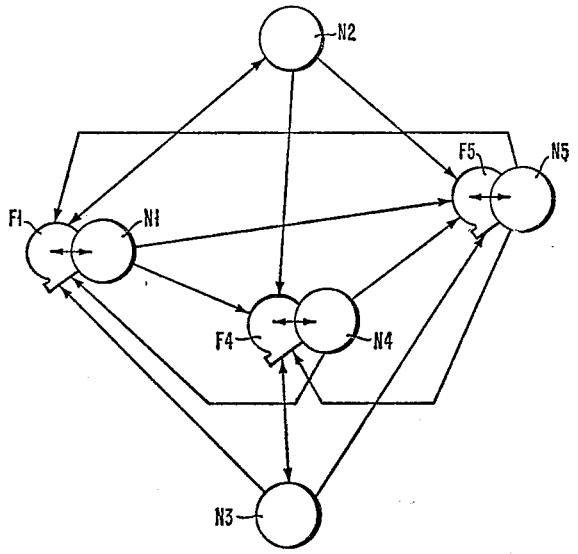

A method for controlling a programmable digital computer to optimize the geographical distribution of identical resources with respect to a plurality of geographically separated users given the costs associated with storing said resource when located at each possible location and the costs associated with each user communicating with each possible location.

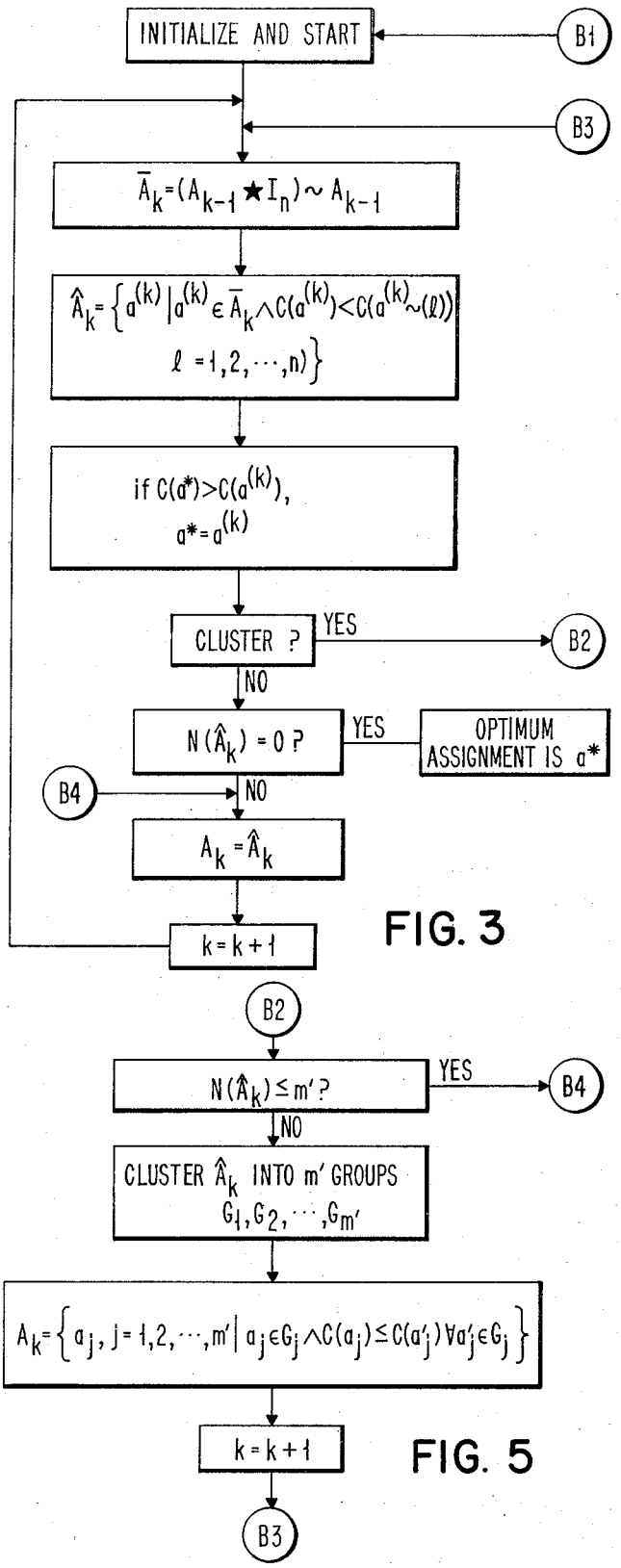
FIG. 3
FIG. 5
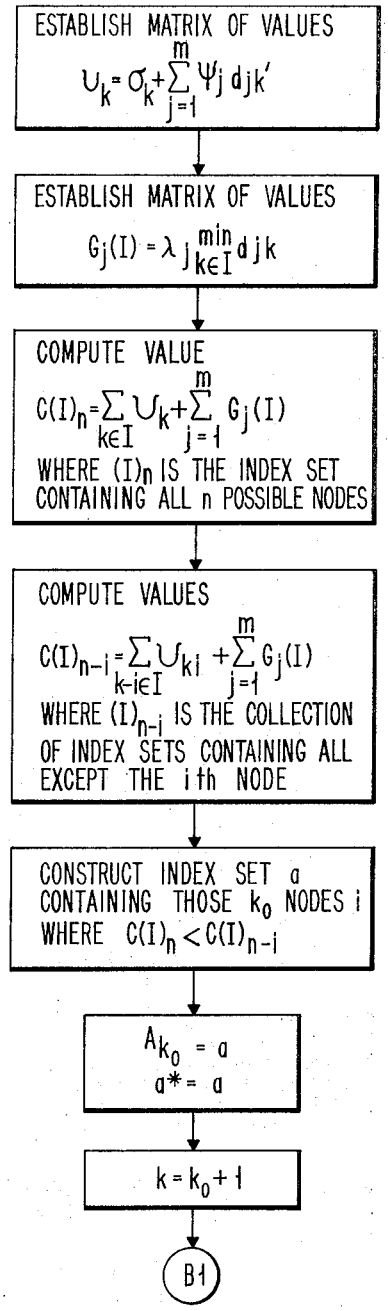
FIG. 4